(12) United States Patent
Schilling et al.

(10) Patent No.: US 7,976,931 B2
(45) Date of Patent: Jul. 12, 2011

(54) MULTI-LAYER FILM, INJECTION MOLDED ARTICLE DECORATED THEREWITH AND PROCESS FOR THE PRODUCTION OF THE DECORATED INJECTION MOLDED ARTICLE

(75) Inventors: Andreas Schilling, Hagendorn (ZG) (CH); Matthias Heinrich, Nürnberg (DE); Andreas Hirschfelder, Fürth (DE)

(73) Assignee: Leonhard Kurz Stiftung & Co. KG, Furth (DE)

( * ) Notice: Subject to any disclaimer, the term of this patent is extended or adjusted under 35 U.S.C. 154(b) by 929 days.

(21) Appl. No.: 11/884,058

(22) PCT Filed: Feb. 3, 2006

(86) PCT No.: PCT/EP2006/000934
§ 371 (c)(1),
(2), (4) Date: Oct. 25, 2007

(87) PCT Pub. No.: WO2006/084631
PCT Pub. Date: Aug. 17, 2006

(65) Prior Publication Data
US 2008/0213541 A1      Sep. 4, 2008

(30) Foreign Application Priority Data

Feb. 10, 2005  (DE) .......................... 10 2005 006 074

(51) Int. Cl.
*B32B 3/00*      (2006.01)
*B32B 7/14*      (2006.01)

(52) U.S. Cl. ..... 428/156; 428/161; 428/164; 428/195.1; 428/201; 428/203; 428/913.3

(58) Field of Classification Search .................. 428/156, 428/195.1, 209, 40.1, 41.8, 42.1, 913.3, 161, 428/164, 202, 203, 201; 264/293
See application file for complete search history.

(56) References Cited

U.S. PATENT DOCUMENTS 4,322,450 A    3/1982    Gray, III et al.
(Continued)

FOREIGN PATENT DOCUMENTS

DE            313521         6/1994
(Continued)

OTHER PUBLICATIONS

Blaesi B., et al. "Entspiegeln mit Mottenaugenstrukturen Spritzgiessen Funktionaler Mikrostrukturierter Oberflaechen," XP001116637 (May 2002).

*Primary Examiner* — David R Sample
*Assistant Examiner* — Catherine Simone
(74) *Attorney, Agent, or Firm* — Hoffmann & Baron, LLP

(57) ABSTRACT

The invention concerns multi-layer films for back-molding with a liquid plastic material in an inmold process for the production of a decorated injection molded article of high optical quality and utilitarian suitability, in particular having curved surfaces, wherein the multi-layer film has at least one replication lacquer layer which at least on one of its surfaces has a spatial structure producing a visually perceptible and/or technical effect, wherein a contrast layer which is preferably in the form of a reflection layer is arranged in adjoining relationship with at least one surface with a spatial structure at least in region-wise manner. The invention further concerns an injection molded article which is decorated with a multi-layer film and a process for the production of the article.

27 Claims, 6 Drawing Sheets

U.S. PATENT DOCUMENTS

| | | | |
|---|---|---|---|
| 4,536,016 A * | 8/1985 | Solomon et al. | 283/111 |
| 4,717,615 A | 1/1988 | Reinhart | |
| 5,635,282 A | 6/1997 | Seuss et al. | |
| 5,714,231 A * | 2/1998 | Reinhart | 428/156 |
| 5,731,064 A * | 3/1998 | Suss | 428/195.1 |
| 5,985,078 A * | 11/1999 | Suess et al. | 156/239 |
| 6,982,832 B2 * | 1/2006 | Wild et al. | 359/586 |
| 7,002,746 B2 | 2/2006 | Schilling et al. | |
| 2005/0260386 A1 * | 11/2005 | Heinrich et al. | 428/141 |

FOREIGN PATENT DOCUMENTS

| | | |
|---|---|---|
| DE | 4313521 | 6/1994 |
| DE | 19856827 | 6/2000 |
| DE | 10144259 | 3/2003 |
| DE | 10221482 | 9/2003 |
| DE | 10216561 | 10/2003 |
| DE | 10236810 | 2/2004 |
| EP | 0210619 | 2/1987 |
| EP | 1428684 | 6/2004 |
| GB | 1568533 | 6/1980 |
| GB | 2323554 | 9/1998 |
| JP | 62128720 | 6/1987 |
| JP | 10180801 | 7/1998 |
| JP | 2003103996 | 4/2003 |
| JP | 2004082720 | 3/2004 |
| JP | 2004322501 | 11/2004 |
| JP | 2005003853 | 1/2005 |
| JP | 2005036168 | 2/2005 |
| WO | WO 03/008172 | 1/2003 |
| WO | WO 03095228 A1 * | 11/2003 |

* cited by examiner

MULTI-LAYER FILM, INJECTION MOLDED ARTICLE DECORATED THEREWITH AND PROCESS FOR THE PRODUCTION OF THE DECORATED INJECTION MOLDED ARTICLE

This application claims priority based on an International Application filed under the Patent Cooperation Treaty, PCT/EP2006/000934, filed on Feb. 3, 2006 and German Application No. 102005006074.9-45, filed on Feb. 10, 2005.

FIELD OF THE INVENTION

The invention concerns a multi-layer film for back-molding with a liquid plastic material in an inmold process for the production of a decorated injection molded article, in particular having curved surfaces, wherein the multi-layer film has at least one replication lacquer layer which at least on one of its surfaces has a spatial structure producing a visually perceptible and/or technical effect, wherein a contrast layer which is preferably in the form of a reflection layer is arranged in adjoining relationship with at least one surface with a spatial structure in region-wise or at least region-wise manner. The invention further concerns a decorated injection molded article having an injection molded plastic body whose surface is provided at least region-wise in an inmold process with such a multi-layer film, and a process for the production of the decorated injection molded article.

BACKGROUND OF THE INVENTION

Decoration processes for injection moldings in which a multi-layer film which is possibly already pre-shaped is arranged in an injection molding mold and the injection molding mold is filled with plastic injection molding material, in which case a firm join is produced between the plastic injection molding material and the multi-layer film, are usually referred to as inmold decoration processes or IMD injection molding processes when dealing with multi-layer films which have not been pre-shaped, or as inmold labeling processes or IML processes when dealing with pre-shaped multi-layer films.

Such decorated injection molded articles, processes for the production thereof and inmold-capable multi-layer films are known per se.

DE 102 36 810 A1 discloses partially structured multi-layer films which are suitable for use in injection molding molds. Such an IMD-capable multi-layer film or a multi-layer film for inmold decoration of injection molded parts comprises a carrier film with a decorative element for transfer on to the injection molded part. The carrier film is removed after the decorative element has been applied to the injection molded body. The decorative element has a release layer, a protective lacquer layer, a structure layer with a spatial structure, an intermediate layer, a reflection layer and an adhesive layer. The release layer serves in that respect for releasing the decorative element from the carrier and usually comprises a wax material.

DE 102 21 482 C1 discloses an apparatus for the production of a molding comprising a hardening injection molding material which is decorated by inmold injection with a multi-layer or stamping film having a carrier film and a decorative layer. In that case the stamping film is introduced into the injection molding tool, with the decorative layer of the stamping film facing towards an upper mold portion. When the injection molding material is injected into the injection molding mold cavity of the apparatus through an injection passage the stamping film is caused to adhere closely to the visible side of the injection molded part. In that situation the stamping film is joined to the injection molding material which after hardening is removed from the injection molding mold. After the carrier film is pulled off the decorative layer, the decorated molding is finished. Injection molded articles which are decorated in that way are used in particular in relation to interior parts of automobiles such as door strips, strips in instrument panels, shift lever covers, central console covers and in relation to exterior parts of the automobiles such as door ram guide strips, covers on A, B and C pillars and in the audio and video fields in relation to decorative strips on the casings of radios and televisions. A large number of further areas of use is possible.

As disclosed in JP 62128720 A, IMD films are usually guided between a fixed and a movable part of the injection molding mold by way of a film advance device. In the case of individual image representations in the regions of the decorative film which is to be applied by lamination, the IMD film is also positioned in the correct position relative to the injection molding mold by way of sensors and position markings on the IMD film before the injection molding mold is closed and the IMD film is back-molded with the hot plastic molding material.

SUMMARY OF THE INVENTION

Now, the object of the invention is to provide a multi-layer film by which the optical quality and utilitarian suitability of injection molded articles decorated with multi-layer films in the inmold process are improved. The invention further aims to provide a process for the production of injection molded articles decorated with multi-layer films in the inmold process, which permits the production of such decorated articles enjoying improved optical quality and utilitarian suitability, in a simple and inexpensive manner.

For a first multi-layer film for back-molding with a liquid plastic material in an inmold process for the production of a decorated injection molded article, in particular having curved surfaces, wherein the multi-layer film has at least one replication lacquer layer which at least on one of its surfaces has a spatial structure producing a visually perceptible and/or technical effect, wherein a contrast layer is arranged in adjoining relationship with at least one surface with a spatial structure at least in region-wise manner, that object is attained in that the at least one replication lacquer layer is in the form of a radiation-hardened replication lacquer layer.

The multi-layer film can be used in accordance with the invention not just to optically alter the appearance of an injection molded article by means of the multi-layer film, that is to say in the conventional sense of the term 'decorate', for example to improve the appearance of or embellish it. The multi-layer film can also have a technical function and as a result can alter for example technical properties of the injection molded article which is decorated therewith, such as for example scratch resistance or the capability of dirt repulsion, without influencing the optical appearance of the injection molded article.

A radiation-hardened replication lacquer layer as a carrier of spatial structures, in comparison with the thermoplastic lacquer layers which are therefore highly elastic under the effect of temperature, as are usually employed in relation to inmold-capable multi-layer films as carriers of spatial structures, has the advantage that the radiation-hardened replication lacquer layer has more thermosetting than thermoplastic properties. In the case of conventional inmold-capable multi-layer films, the temperature loading upon back-molding of the multi-layer film in the injection molding mold involves the risk that the thermoplastic lacquer layer softens and the spatial structure contained therein is altered region-wise or completely obliterated. That led to a reduced level of optical quality in respect of the decorated injection molded article. As a radiation-hardened replication lacquer layer withstands higher temperatures than thermoplastic lacquer layers, the spatial structures which are formed therein are not altered upon back-molding of the multi-layer film or at least are altered markedly less in comparison with the spatial structures in thermoplastic lacquer layers.

As is known radiation-hardening replication lacquer layers are provided with a spatial structure in particular by means of a stamping roller or a stamping punch, in the unhardened or partially hardened condition, and are then completely hardened by radiation. In particular it has proven to be appropriate in that respect if radiation hardening of the replication lacquer layer is effected by means of UV radiation. UV-hardened replication lacquers based on monomeric or oligomeric polyester acrylates, polyether acrylates, urethane acrylates or epoxy acrylates as well as amine-modified polyester acrylates, amine-modified polyether acrylates, or amine-modified urethane acrylates have proven their worth.

Preferably an intaglio printing process is used as the process for applying a UV-hardenable replication lacquer. Such a process makes it possible readily to achieve the lacquer thickness required for the replication lacquer layer, and it is possible for the production procedure to be operated as a continuous process. Alternatively however it is also possible to use other coating processes. Slit nozzle coating, screen printing, intaglio printing, flexographic printing, offset printing and so forth are to be mentioned by way of example in that respect.

In that connection a layer thickness in the range of between 0.5 and 10 µm has proven its worth for a radiation-hardened replication lacquer layer.

In order to ensure good adhesion of the contrast layer to the radiation-hardened replication lacquer layer, a thin bonding layer of a layer thickness in the nanometer range can be arranged between the radiation-hardened replication lacquer layer and the contrast layer.

The spatial structures in the radiation-hardened replication lacquer layer are particularly well maintained in the inmold process if a material is so selected for the radiation-hardened replication lacquer layer that it only softens at temperatures above the injection temperature of the plastic material used for the back-molding operation. It is particularly preferable if the radiation-hardened replication lacquer layer only softens at temperatures above the material temperatures occurring in the tool. As they are greatly influenced by the injection molding material used and the component geometry and are thus difficult to predict particularly when back-molding films, it has proven to be advantageous if the softening range of the radiation-hardened replication lacquer layer is at least 20 K above the injection temperature of the injection molding material used.

It has further proven to be advantageous if the multi-layer film has a receiving layer which involves the full surface area as viewed perpendicularly to the plane of the multi-layer film and on which the radiation-hardened replication lacquer layer is only disposed in region-wise manner. That has proven its worth in particular when the radiation-hardened replication lacquer layer is of a small layer thickness in the range of between 0.5 and 2 µm and therefore does not involve adequate scratch resistance, as a surface for the decorated injection molded article. When layer thicknesses in respect of the radiation-hardened replication lacquer layer in the range of between 2 and 10 µm are involved, it is optionally possible to dispense with a protective receiving layer.

As radiation-hardened replication lacquers can involve a lower degree of stretchability in comparison with thermoplastic replication lacquers, damage phenomena such as overstretching or cracks can occur in the film or film layers during the inmold process in the region where the multi-layer film involves severe degrees of curvature. The use of the receiving layer has also proven its worth here as the radiation-hardened replication lacquer of relatively low stretchability can be applied only in region-wise manner to the receiving layer and only the regions of the multi-layer film which are not curved or which are curved only slightly in decoration of the injection molded article can be provided with the radiation-hardened replication lacquer.

It is particularly preferred if the radiation-hardened replication lacquer layer is disposed only in regions of the multi-layer film which, on the injection molded article decorated with the multi-layer film, involve a radius of curvature of greater than 0.7 mm and a stretch of less than 10%—with respect to the dimensions of the regions of the multi-layer film prior to back-molding thereof with plastic material. In that way it is possible to effectively prevent structural damage in the radiation-hardened replication lacquer layer in the region of severely curved surfaces of the injection molded article decorated therewith.

It is particularly preferred if the multi-layer film forms the transfer layer of a transfer film, in which case the transfer film has a carrier film which can be released from the multi-layer film and the multi-layer film is arranged at least region-wise on one side of the carrier film. Transfer layers of transfer films are, when considered in themselves, usually very thin and not self-supporting as they are formed by thin layer configurations.

The carrier film of the transfer film protects the multi-layer film from damage prior to and during the inmold process and can be pulled off after removal of the decorated article from the injection molding mold.

A structuring lacquer can be applied in pattern form on the side of the carrier film remote from the multi-layer film, or within the multi-layer film, in order to perceptibly or only optically spatially structure the surface of the decorated article during the inmold process.

What is preferred here is a transfer film including a carrier film having a first side and a second side, wherein arranged on the first side of the carrier film is a release layer and arranged on the side of the release layer that is remote from the carrier film is a transfer layer means, wherein a structure layer with a layer thickness of at least 9 µm comprising a structuring lacquer whose compression strength is substantially constant at least up to a temperature of 200° C. is partially arranged either on the second side of the carrier film or on the side of the transfer film, that is in opposite relationship to the second side of the carrier film.

In that respect the structuring layer preferably comprises:
a) a thermosetting material or a thermoplastic material with a glass transition temperature Tg above 200° C., or
b) is formed from a lacquer system filled with a filler, or
c) is a radiation-hardenable, an ESH-hardenable, an epoxy-hardenable, an isocyanate-hardenable or an acid-hardenable lacquer.

By way of example the following melamine-crosslinking composition can be used as the structuring lacquer for forming the structure layer, using intaglio printing technology:

| | |
|---|---|
| 8 parts | ethanol |
| 8 parts | isopropanol |
| 10 parts | toluene |
| 3 parts | methyl ethyl ketone |
| 26 parts | hexamethoxymethylmelamine |
| 30 parts | solution of a hydroxy-functionalised polymethylmethacrylate (60%) in xylene |
| 7 parts | pigment carbon black |
| 2 parts | high-molecular dispersing additive |
| 6 parts | p-toluene sulfonic acid |

Alternatively the following, UV-hardening composition can be used as the structuring lacquer for forming the structure layer 9 using a screen printing procedure:

| | |
|---|---|
| 25 parts | hexane-diol diacrylate HDDA |
| 35 parts | oligomer of an aliphatic urethane acrylate |
| 30 parts | acrylated oligoamine resin |
| 4 parts | photoinitiator type 1 (for example Irgacure ® 1000 from Ciba Geigy) |
| 6 parts | pigment Red 122 |

In addition it is possible to use the following crosslinking structuring lacquer:

| | |
|---|---|
| 10 parts | ethanol |
| 8 parts | isopropanol |
| 5 parts | methyl ethyl ketone |
| 8 parts | toluene |
| 20 parts | hexamethylmethylmelamine |
| 27 parts | solution of a hydroxy-functionalised polymethylmethacrylate (60%) in xylene |
| 15 parts | pyrogenic silicic acid |
| 7 parts | p-toluene sulfonic acid |

In addition it is possible to use the following, non-crosslinking structuring lacquer which is highly filled with an inorganic filling agent:

| | |
|---|---|
| 30 parts | methyl ethyl ketone |
| 10 parts | butyl acetone |
| 10 parts | cyclohexanone |
| 8 parts | polymethylmethacrylate (molecular weight 60,000 g/mol) |
| 4 parts | polyvinylchloride mixed polymer with a vinyl chloride content of 80 to 95% |
| 3 parts | high-molecular dispersing additive |
| 35 parts | titanium dioxide |

If required further layers can be arranged between the transfer film and the multi-layer film such as for example a release layer which facilitates or improves the separation of the carrier film and the decorated injection molded article after implementation of the inmold process. Preferably plastic layers which are highly crosslinked by radiation hardening, isocyanate hardening or acid hardening are used here as release layers.

It will be appreciated however that the release layer can alternatively also be a wax-like layer.

A release layer comprising a UV hardened, highly crosslinked plastic material can be formed for example by UV radiation of the following composition:

| | |
|---|---|
| 25 parts | methyl ethyl ketone |
| 25 parts | ethyl acetate |
| 5 parts | cyclohexanone |
| 18 parts | polymethylmethacrylate (molecular weight 60,000 g/mol) |
| 25 parts | dipentaerithrolpentaacrylate |
| 2 parts | photoinitiator type 1 (for example Irgacure ® 1000 from Ciba Geigy) |

Alternatively the release layer can be acid-hardened and formed from the following composition:

| | |
|---|---|
| 10 parts | ethanol |
| 10 parts | isopropanol |
| 5 parts | methylethylketone |
| 10 parts | toluene |
| 25 parts | hexamethylmethylmelamine |
| 30 parts | solution of a hydroxy-functionalised polymethylmethacrylate (60%) in xylene |
| 10 parts | p-toluene sulfonic acid |

Alternatively the release layer can be isocyanate-hardened and formed from the following composition:

| | |
|---|---|
| 15 parts | butyl acetate |
| 10 parts | cyclohexanone |
| 40 parts | solution of a hydroxy-functionalised polymethylmethacrylate (60%) in ethoxy propanol |
| 35 parts | Desmodur ® IL (diisocyanate, available from Bayer, Leverkusen) |

Only region-wise arrangement of the radiation-hardened replication lacquer layer is also possible, using the carrier film, without a layer which is present throughout, in the construction of the multi-layer film.

When the multi-layer film is in the form of a lamination film which is self-supporting by virtue of its greater thickness, the above-mentioned receiving layer for example can provide the closed film body. In the lamination film however layers which are not directly connected to the radiation-hardened replication lacquer layer can also afford the carrier function for the radiation-hardened replication lacquer layer which is present in region-wise manner.

In order to afford excellent adhesion between the multi-layer film and a plastic material to be joined thereto, it has proven to be advantageous if an adhesive layer is arranged on one of the sides thereof, preferably on the side of the contrast layer, that is remote from a transparent, radiation-hardened replication lacquer layer. Hot melt adhesive or pressure-activatable cold adhesives are generally suitable here, but usually hot melt adhesives are used in an IMD process. Preferably further layers such as decoration layers or bonding layers can be arranged between the adhesive layer and the contrast layer.

If the choice of material and the design of the multi-layer film are so selected that the surface of the multi-layer film, which in the back-molding operation comes into contact with the liquid plastic material, has a sufficient quantity of and an optimum distribution of at least regions which can be satisfactorily connected to the liquid plastic material even without adhesive, it is however also possible to completely dispense with the adhesive layer.

It has proven worthwhile if a transparent, radiation-hardened replication lacquer layer adjoins the carrier film, in which case the spatial structure is embossed on the side of the radiation-hardened replication lacquer layer, that is remote from the carrier film. In the situation where the transparent radiation-hardened replication lacquer layer forms the surface of the decoration injection molded article and the spatial structure is arranged on the rear side of the radiation-hardened replication lacquer layer, that is remote from an observer of the decorated injection molded part, the observer can see it through the transparent radiation-hardened replication lacquer layer.

The radiation-hardened replication lacquer layer however can also be opaque, in which case the spatial structure must be arranged towards the observer. Optionally the spatial structure on the decorated injection molded article is then to be covered by a transparent protective or lacquer layer or a protective further transparent injection thereover in an inmold process (see above) in order to protect it from damage.

A receiving layer in the layer composite of the multi-layer film, the receiving layer being arranged between the carrier film of the transfer film and the radiation-hardened replication lacquer layer, can implement the protection function for the spatial structure if it is transparent.

The contrast layer is preferably in the form of a reflection layer formed from a metallic and/or non-metallically inorganic reflective material. Metallic reflection layers which have proven their worth here are inter alia those with at least one metal from the group aluminum, gold, silver, platinum, copper, nickel, chromium, tin, indium or alloys thereof, which are usually vapor-deposited, applied by sputtering, or produced by way of galvanic baths. Suitable materials for inorganic-non-metallic reflection layers are for example $TiO_2$, $ZnS$, $MgF_2$ or $SiO$ which are usually vapor-deposited or applied by sputtering. Combinations of metallic with non-metallically inorganic layers forming a multi-layer reflection layer have also proven their worth.

Particularly attractive effects are afforded if the contrast layer has first regions and, arranged therebeside as viewed in the plane of the multi-layer film or arranged in partially overlapping relationship with the first regions, at least second regions, wherein the contrast layer is different in the first regions and in at least the second regions, in particular in regard to transparency and color impression.

It has proven its worth if the spatial structure is at least region-wise in the form of a macroscopic structure, wherein the macroscopic structure is of an extent in the plane of the radiation-hardened replication lacquer layer of at least 0.03 mm and an extent in perpendicular relationship to the plane of the radiation-hardened replication lacquer layer in a range of between 0.01 and 0.1 mm.

It has equally proven worthwhile if the spatial structure is at least region-wise in the form of a diffractive structure. It is particularly preferred in that respect if the spatial structure is at least region-wise in the form of a matt structure, in particular an asymmetrical matt structure. Matt structures have on the microscopic scale fine relief structure elements which determine the scatter capability and which can only be described with statistical parameters such as for example mean roughness value $R_a$, correlation length $I_c$ and so forth, wherein the values for the mean roughness value $R_a$ are in the range of between 20 nm and 5000 nm, with preferred values of between 50 nm and 1000 nm, while the correlation length $I_c$ in at least one direction involves values in the range of between 200 nm and 50,000 nm, preferably between 500 nm and 10,000 nm. Reference is made in that respect for example to DE 102 16 561 A1 which inter alia describes matt structures. The microscopically fine relief structure elements of an isotropic matt structure do not have any azimuthal preferred direction, for which reason the scattered light, of an intensity greater than a predetermined limit value, for example predetermined by visual perceptibility, is distributed uniformly in all azimuthal directions in a solid angle which is predetermined by the scatter capability of the matt structure and the surface element appears white to gray in daylight. Upon a change in the tilt angle away from the vertical the surface element appears dark. Greatly scattering matt structures distribute the scattered light into a greater solid angle than weakly scattering matt structures. If the relief elements of the matt structure have a preferred direction the scattered light involves an anisotropic distribution.

Matt structures are preferably arranged in regions of the decorated injection molded article which are more heavily curved as the discernibility of the matt structure is not influenced or is scarcely influenced by such an arrangement.

It has further proven desirable if the diffractive structure forms a hologram or a Kinegram® and is arranged only in regions of the multi-layer film, which involve a stretch of <10% on the article decorated with the multi-layer film. In heavily curved regions of the decorated injection molded article and thus in regions involving severe stretching of the multi-layer film optical discernibility of the hologram or Kinegram® is adversely affected under some circumstances.

Furthermore optically attractive effects are afforded if the multi-layer film has spatial structures in the form of lens elements or free form surfaces, in particular diffractive lenses or diffractive free form surfaces.

Preferably the multi-layer film has a marking which is introduced by means of a laser, in particular in the form of alphanumeric characters, geometrical patterns or graphic representations. Region-wise extinction of spatial structures can also be effected by means of laser. As a laser marking can also be applied to the layer composite of the multi-layer film after the production of the multi-layer film, the multi-layer film can easily be individualised for example in regard to a manufacturer identification or other information.

In regard to the visually attractive configuration of the multi-layer film it has proven particularly desirable if the multi-layer film has at least one colored decorative print, for example a region-wise arrangement of colored lacquer. The arrangement of the decorative print in the multi-layer film composite can be substantially as desired and depends on whether a transparent or opaque radiation-hardened replication lacquer layer is used or from which side the observer views the multi-layer film on the decorated injection molded article. As both transparent and opaque plastic materials can be used for back-molding of the multi-layer film, there are various possible options available here in regard to the design configuration of the multi-layer film. Thus the decorative print can be formed directly on the radiation-hardened replication lacquer layer or the contrast layer. If the contrast layer is viewed for example through a transparent radiation-hardened replication lacquer layer and if the decorative print is arranged behind the contrast layer, from the point of view of the observer, then the contrast layer must be transparent or semi-transparent at least in region-wise manner in order to be able to see the decorative print. Semi-transparency in respect of a contrast layer which is in the form of a metallic reflection layer can be achieved for example by applying a metallic dot raster or the like. As is known, when using metals, transparent reflection layers are also to be achieved by way of a suitably small layer thickness while non-metallically inorganic materials are also at least partially transparent even when using comparatively greater layer thicknesses.

In addition it has been found to be desirable if the multi-layer film has at least one decorative print which coincides in terms of color with the radiation-hardened replication lacquer layer, in which case the decorative print is arranged on the radiation-hardened replication lacquer layer and the spatial structure is optically extinguished in region-wise manner in the radiation-hardened replication lacquer layer. Attention is directed here to DE 102 36 810 A1 describing such a procedure.

Particularly expressive multi-layer films are achieved if the decorative layer forms a geometrical or graphic pattern. In that case the decorative print can supplement or provide a color configuring in region-wise manner in respect of a pattern or partial pattern which is also predetermined by the spatial structure. In that case, in order to achieve the desired optical impression, alignment of the spatial structure with the decorative print in accurate register relationship is required.

In addition the multi-layer film can have thin films which generate a viewing angle-dependent color change effect, based on interference phenomena. Here, combinations of thin films which differ in terms of the substances involved, in the form of a thin film stack, or the use of liquid crystal polymer layers, have long been known. It is also possible to use per se known optically variable inks (OVI).

In regard to the optical quality and utilitarian suitability of the article decorated with the multi-layer film, it is advantageous if the multi-layer film has a dirt-repellent layer and/or a scratch-resistant layer which forms the surface of the decorated injection molded article. In that respect dirt-repellent layers whose surfaces are microstructured and have a lotus effect can be used.

The object is further attained by a second multi-layer film for back-molding with a liquid plastic material in an inmold process for the production of a decorated injection molded article having curved surfaces, optionally combined with features of the above-described first multi-layer film according to the invention, wherein the multi-layer film has at least one replication lacquer layer which at least on one of its surfaces has a spatial structure producing a visually perceptible and/or technical effect, wherein a contrast layer is arranged at least region-wise in adjoining relationship with at least one surface with a spatial structure, in that the spatial structure in the multi-layer film is distorted at least region-wise in such a way that after production of the injection molded article which is decorated with the multi-layer film the spatial structure is optically distortion-free perceptible on the curved surfaces. In that respect the spatial structure is introduced in inversely distorted relationship into the multi-layer film depending on whether the multi-layer film is applied to a convex or concave surface and resulting therefrom the spatial structure is correspondingly deformed by stretching or compressing. In regions in which the spatial structure is stretched during the inmold process, a compressed spatial structure is produced in the multi-layer film, and vice-versa.

The forces acting on the multi-layer film in the inmold process stretch the film and lead to deformation of the spatial structure which is correspondingly greater, the more the multi-layer film is curved. That affords an unpleasant optical impression which is effectively avoided by the second multi-layer film according to the invention. The deformation in the spatial structure which is produced by the curvature of the multi-layer film in the back-molding operation can however be determined and so superposed with the desired spatial structure that a distorted image of the spatial structure is present in the multi-layer film prior to the back-molding operation, and a distortion-free or almost distortion-free image of the spatial structure presents itself to the observer after back-molding of the multi-layer film even in regions with curvatures. The operation of determining the required preliminary compensation in the spatial structure must be implemented separately for each component shape.

For that purpose for example in a first method an experimental test is carried out with a multi-layer film with a regular diffractive grating raster as the spatial structure. Plastic material is injection molded behind the multi-layer film and the grating constants of the grating raster, which are then present in a deformed condition on the component, are measured off. After characterisation and quantification of the resulting deformations of the grating raster, and possibly additionally the diffraction efficiencies, the results are inverted and correspondingly transferred to the regular diffractive grating raster so that the result is a distorted, compressed grating raster in the multi-layer film. When now plastic material is molded behind the multi-layer film which has been prepared in that way, the pre-calculated deformation phenomena occur and the correspondingly pre-compensated compressed grating raster is so stretched that the result is a regular diffractive grating raster.

In a second method the component which results in the injection molding operation is viewed and measured in a perpendicular projection. The curvatures on the component correspond to a local inclination (gradient) which in the perpendicular projection is associated with a given point on the multi-layer film. When calculating the necessary distortion of the spatial structure the gradient which is later to be found at a point on the multi-layer film is taken into consideration in inverted relationship.

In a third method the local curvature of the multi-layer film on the decorated injection molded article is calculated or estimated. A correction factor is calculated from the local curvature and used to produce the distorted image. In that situation pre-compensation is effected proportionally and possibly even over-proportionally in relation to the curvature which is later involved.

A fourth method involves using an analogy conclusion process in which for example metal is deformed and it is assumed that the distortions which occur in that case will be involved in the same fashion in the multi-layer film. The result obtained for the metal is transferred to the required distortion of the spatial structure in the multi-layer film.

It will be noted however that what is common to these methods is that the regions of the multi-layer film which experience a high level of deformation in production of the injection molded article which is decorated with the multi-layer film have a distortion or have a greater degree of distortion than the regions of the multi-layer film which experience no deformation or a lower level of deformation in production of the injection molded article which is decorated with the multi-layer film. The extent of pre-compensation in respect of the deformation of the spatial structure depends on the curvature of that region of the multi-layer film in the production of the injection molded article decorated with the multi-layer film and is proportional thereto. In regions involving a high degree of curvature the spatial structure in the multi-layer film is heavily deformed so that a greater change in the spatial structure has to be implemented there, than in regions involving a low degree of curvature.

The distortion of the spatial structure in the multi-layer film can be in a three-dimensional space defined by an x-axis, a y-axis and a z-axis, in the direction of the x-axis and/or in the direction of the y-axis and/or in the direction of the z-axis.

The following for example can be considered as possible calculation processes for calculating the deformation and the pre-compensation resulting therefrom:
  finite element methods for solving partial differential equations which describe the deformation of components under the effect of mechanical forces, projection methods in which the local area magnification factor is determined, which is scaled with the cosine of the local gradient angle, or calculation of the local curvatures based on the mechanical design (for example CAD data).

In that respect various ones of the above-indicated methods for determining the necessary distortion can be combined together. Thus for example in a first step the second of the above-mentioned methods (viewing in perpendicular projection) can be carried out and on the basis of the results a pattern foil is produced and experimentally tested in accordance with the first method. The results from the test can show whether minor corrections are still required and they are possibly additionally taken into consideration in the multi-layer film. The optical result afforded is accordingly still further improved by a combination of the methods.

Distortion of the spatial structure is preferably effected by an at least partial change in:

the grating period for altering the local diffraction angle and/or the structure depth for controlling the diffraction efficiency and/or the profile shape for adaptation or correction of the angle distribution of the reflected light and/or the azimuth orientation for adaptation/correction of the angle distribution of the reflected light.

The second multi-layer film according to the invention, besides the spatial structure, preferably has further optically visible markings, in particular a laser marking, a reflective marking or a print image which are of a distorted nature in at least region-wise fashion in such a way that the further spatial markings, after production of the injection molded article decorated with the multi-layer film by means of the inmold process, are optically distortion-free perceptible on the curved surfaces. The distortion effects necessary for the multi-layer film are determined in a similar manner to the foregoing methods and applied to the production of the further optically visible markings insofar as the thickness and/or aereal extent of the further optically visible marking is appropriately pre-compensated.

The object is further attained for a third multi-layer film for back-molding with a liquid plastic material in an inmold process for the production of decorated injection molded articles, possibly combined with features of the above-described first and/or second multi-layer film according to the invention, wherein the multi-layer film has at least one replication lacquer layer which at least on one of its surfaces has a spatial structure producing a visually perceptible and/or technical effect, wherein a contrast layer is arranged only region-wise in adjoining relationship with at least one surface with a spatial structure, insofar as the multi-layer film in regions without a contrast layer has at least in region-wise manner at least one function layer which can correspond to the replication lacquer layer, wherein the at least one function layer has reflecting and/or transmitting structures which are in the form of light-diffracting, light-refracting, light-diffusing, light-polarising or light-absorbing microstructures or nanostructures.

Such function layers have a technical function and can be integrated into multi-layer films which are used decoratively.

In that respect it has proven desirable if the function layer includes a) at least one diffuser element for producing a uniform or adapted light distribution over the surface of the injection molded article decorated with the multi-layer film, and/or b) at least one magnification lens with diffractive or refractive lens optical means, and/or c) at least one dereflection layer or a motheye structure for reducing reflection phenomena or improving transmission, and/or d) at least one polarisation filter layer, and/or e) at least one filter layer for filtering given wavelengths of visible light.

It has further proven to be desirable if the microstructures or nanostructures are selected from the group including matt structures, Fresnel lenses, microprisms, free form surfaces (diffractive) or grating structures, in particular linear grating structures, cross grating structures, hexagonal grating structures, circular grating structures, blaze grating structures or combinations of those grating structures.

Dirt-repellent layers with a lotus effect, that is to say with a surface which in the microscopic range has regular micro-raised portions like the leaves of a lotus flower have also proven their worth as the function layer.

A decorated injection molded article with an injection molded plastic body whose surface is covered at least in region-wise fashion in an inmold process with and connected to a multi-layer film according to the invention enjoys ideal optical properties and further has improved utilitarian suitability.

It has been found to be advantageous if the plastic injection molding material for back-molding of the multi-layer film is formed from ABS, an ABS/PC mixture, PC, PA, SAN, ASA, TPO, PMMA, PP or a mixture of at least two of those materials insofar as they are mutually compatible. Plastic materials of that kind can be reliably processed on injection molding machines.

It is particularly advantageous if the decorated injection molded article forms an opaque or at least partially transparent housing component of an electronic device, in particular a telephone or cell phone. Function layers of the multi-layer film are preferably arranged in regions of the at least partially transparent housing component, in particular in the region of the display window of the telephone or cell phone. Thus it is possible to arrange there for example magnification lenses, dereflection layers or also diffuser elements, to make displays better readable.

Preferably only function layers are disposed in the region of the transparent display window above the display means. In that case the edge region of the display window is of a decorative configuration at least by means of the spatial structure, in which respect the display window has an optically attractive edge region at all sides.

It has further proven to be desirable if the decorated injection molded article forms a cladding component for the interior or exterior of an automobile. Thus the decorated injection molded article according to the invention is preferably arranged in the region of the instrument panel.

The object in terms of the process is attained in that the multi-layer film for forming a mechanically reinforced multi-layer film is embossed on to a flat, thermoplastic plate, the mechanically reinforced multi-layer film is thermoformed to afford a shell portion and the shell portion is back-molded with a plastic material in an inmold process.

In that case the thickness of the plastic plate is preferably between about 125 μm and 5 mm. Such a 'plastic plate' is possibly only a self-supporting film, preferably of a thickness in the range of between about 125 μm and 250 μm. In that respect it is desirable if, after the multi-layer film has been laminated on to the self-supporting film or plastic plate, a semi-manufactured article which is stable in respect of shape is afforded. When using plastic plates involving thicknesses in the mm range, it is optionally possible to dispense with a subsequent back-molding operation, by virtue of the high level of stability in respect of shape of the component formed.

The process according to the invention is particularly preferably used for decorated injection molded articles whose mechanically reinforced multi-layer film was only deformed in partial regions in the thermoforming operation.

Substantially no deformation of the multi-layer film is involved in the operation of applying the multi-layer film by embossing and reinforcing it by means of the plastic plate so that the spatial structures contained therein remain unchanged or substantially unchanged. Then the reinforced multi-layer film is shaped to afford a shell portion, in which case no deformation of the spatial structure occurs in the regions which remain flat as, in those regions, by virtue of the reinforcement, the multi-layer film does not stretch or stretches only to an immaterial degree. The plastic plate provides that the stresses occurring in the curvature region of the reinforced multi-layer film, in the deformation operation, can no longer be distributed or can be distributed only restrictedly laterally, that is to say in the plane of the multi-layer film. As a result the layers of the multi-layer film are deformed to a greater extent in the region of the curves produced, but are correspondingly less deformed in the regions which remain flat, so that an optically irreproachable image in respect of the spatial structure remains there.

The shell portion formed is now either back-molded by the multi-layer film which is embossed on to the plastic plate facing towards the injected plastic material. Alternatively the shell portion formed is back-molded by the shaped thermoplastic plate facing towards the injected plastic material. In this case also the transparency or opacity of the multi-layer film and the plastic plate govern whether a transparent or opaque plastic material is to be used for the back-molding operation and which side of the shell portion is to be joined to the injection molding material.

BRIEF DESCRIPTION OF THE DRAWINGS

FIGS. 1 through 4 show various multi-layer films with radiation-hardened replication lacquer layers, FIG. 5 shows a regular diffractive X-Y grating raster, FIG. 6 shows the X-Y grating raster of FIG. 5 after deformation, FIGS. 7 and 8 diagrammatically show the detection of local inclination gradients at curved surfaces in a perpendicular projection, FIG. 9 diagrammatically shows an apparatus for shaping a mechanically reinforced multi-layer film, FIG. 10 is a diagrammatic view in cross-section of the shell portion formed by means of the apparatus, FIG. 11 shows the shell portion of FIG. 10 which is back-molded with plastic material on the side of the plastic plate, and FIG. 12 shows the shell portion of FIG. 10 which is back-molded with plastic material on the side of the shell portion, that is opposite to the plastic plate.

DETAILED DESCRIPTION OF THE INVENTION

Figure 1:
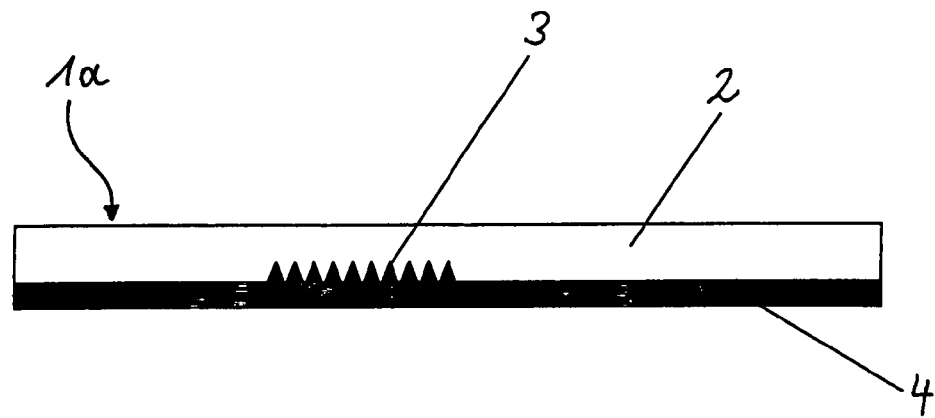
FIGS. 1 through 12 are intended to describe the multi-layer films according to the invention by way of example. In the drawings.

Thus FIG. 1 shows an inmold-capable multi-layer film 1*a* with a radiation-hardened replication lacquer layer 2 of amine-modified polyester acrylate, a spatial structure 3 which is embossed into the radiation-hardened replication lacquer layer 2 and a contrast layer which is in the form of a semi-transparent reflection layer 4 of aluminum and which covers the radiation-hardened replication lacquer layer 2 on its side having the spatial structure 3. The reflection layer 4 is in the form of a dot raster, not visible here, and does not completely cover the radiation-hardened replication lacquer layer 2. The multi-layer film 1*a* is self-supporting in the form of a lamination film and can have further layers such as for example an adhesive layer. The multi-layer film 1*a* is preferably used on surfaces of injection molded articles, being surfaces which are not curved or which are moderately curved.

Figure 2:
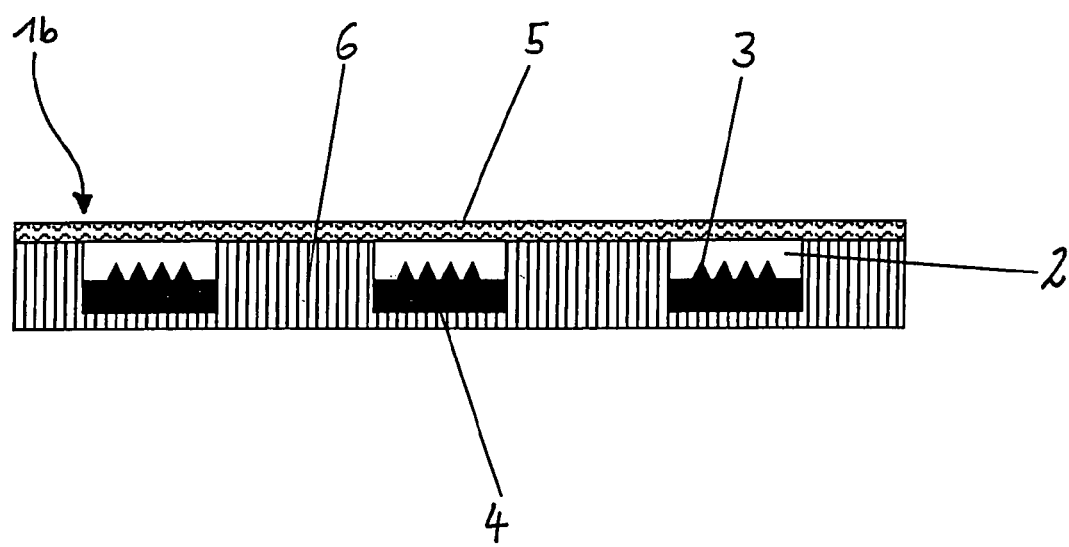

FIG. 2 shows a further multi-layer film 1*b* having a receiving layer 5 of clear lacquer, which is coated only in region-wise manner with the radiation-hardened replication lacquer layer 2. A contrast layer in the form of a reflection layer 4 and a spatial structure 3 which is embossed by means of a stamping punch can be seen on the side of the radiation-hardened replication lacquer layer 2, that is remote from the receiving layer 5. An adhesive layer 6 comprising a heat-sealable adhesive covers the reflection layer 4 as well as the regions, which are free therefrom, of the receiving layer 5. The multi-layer film 1*b* is also self-supporting in the form of a lamination film and can have further layers such as for example bonding layers.

Figure 3:
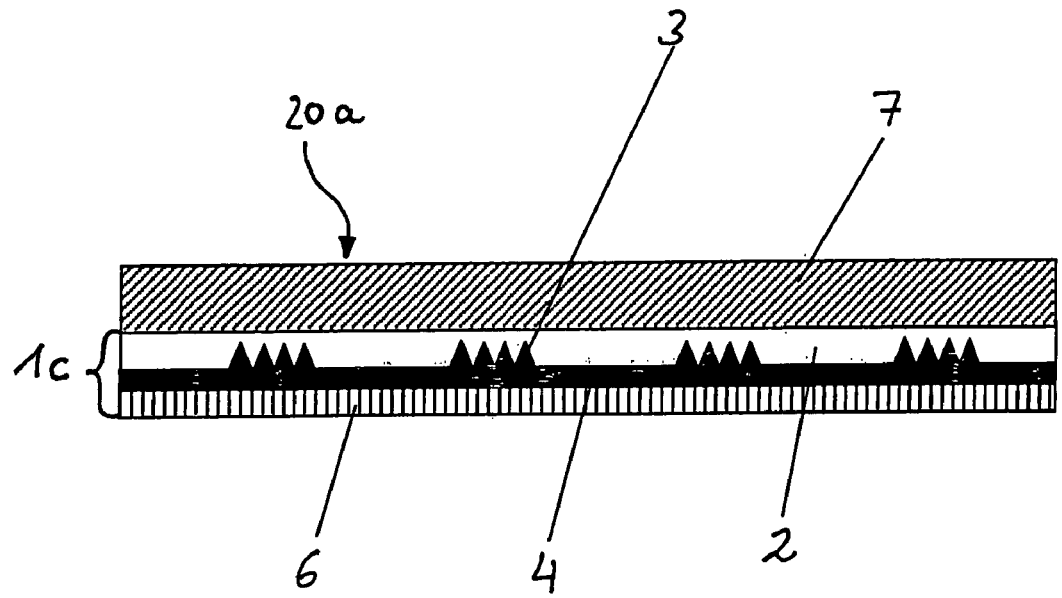

FIG. 3 shows a transfer film 20*a* having a carrier film 7 and a multi-layer film 1*c* as a transfer layer means. The carrier film 7 can be released from the multi-layer film 1*c* after the inmold process. The multi-layer film 1*c* has a transparent, colored radiation-hardened replication lacquer layer 2 with a spatial structure 3 and a contrast layer in the form of a reflection layer 4 of vapor-deposited aluminum. An adhesive layer 6 comprising a heat-sealable adhesive covers the reflection layer 4.

Figure 4:
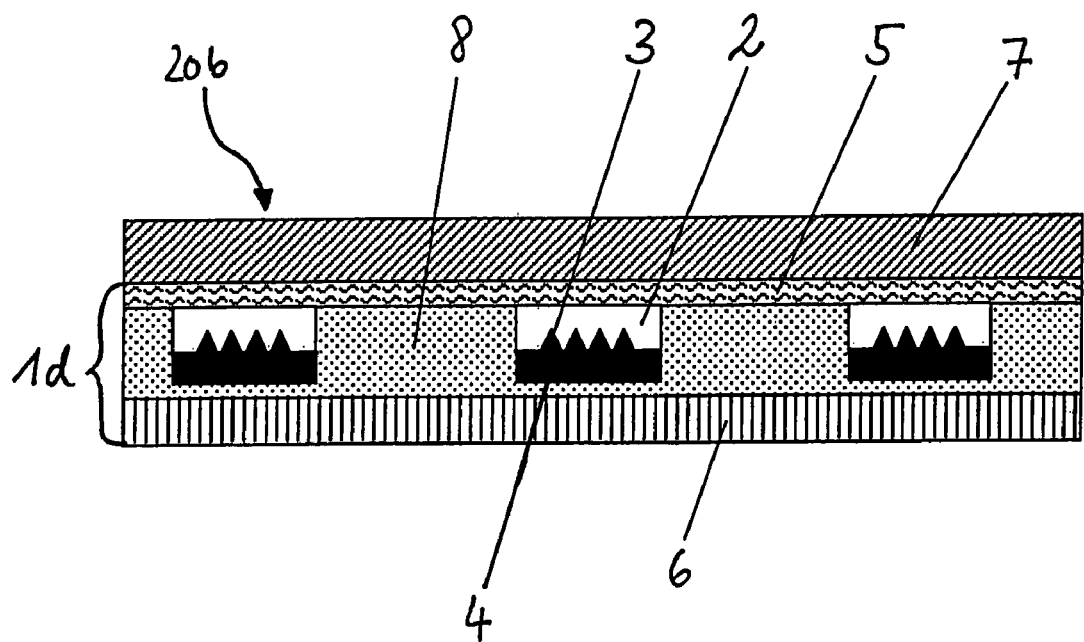

FIG. 4 shows a further transfer film 20*b* having a carrier film 7 and a multi-layer film 1*d* as a transfer layer means. The carrier film 7 can be released from the multi-layer film 1*d* after the inmold process. The multi-layer film 1*d* has a receiving layer 5 of clear lacquer, on which in pattern form there is a transparent, colored radiation-hardened replication lacquer layer 2 having a spatial structure 3, together with a contrast layer in the form of a reflection layer 4 of vapor-deposited aluminum. A decorative print 6 of opaque, colored lacquer is applied by printing to the reflection layer 4 and the free regions of the receiving layer 5. An adhesive layer 6 of a heat-sealable adhesive covers the decorative print 8.

The transfer films 20*a*, 20*b* of FIGS. 3 and 4 are used for example in such a way that they are introduced into an injection molding mold and are back-molded, in which case the carrier film 7 bears against the inside wall of the injection molding mold. The liquid plastic injection molding material which is urged into the injection molding mold presses the transfer film against the inside wall and fills the injection molding mold, in which case the plastic injection molding material is joined to the adhesive layer. After cooling of the plastic injection molding material and the production of a solid injection molded body which is decorated with the multi-layer film, the injection molding mold is opened and the carrier film is detached.

Figure 5:
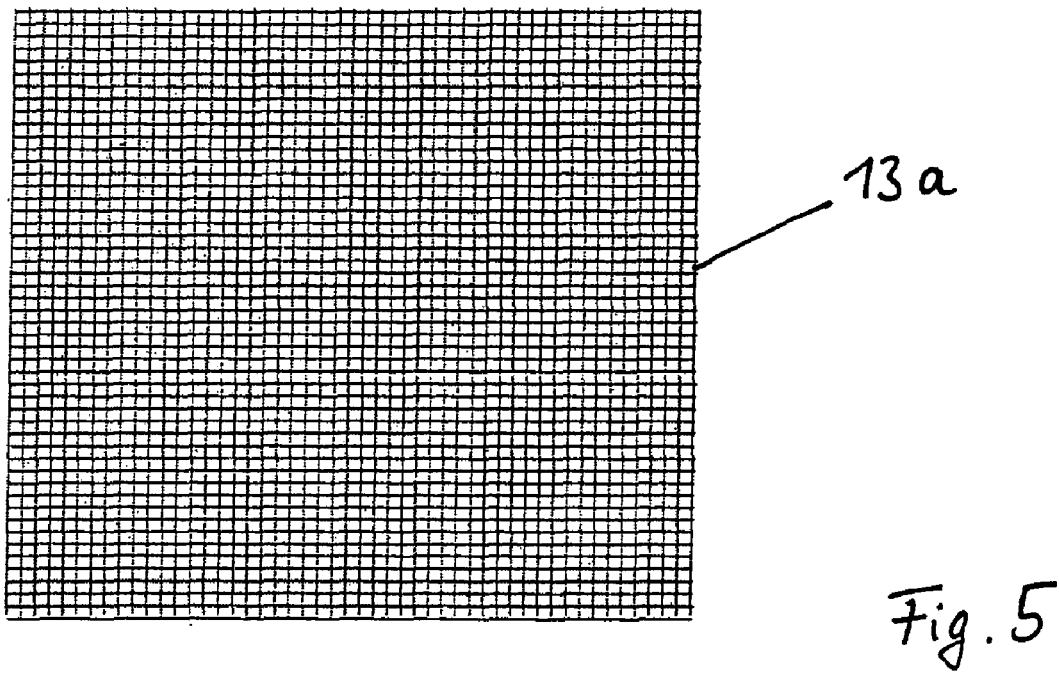
Figure 6:
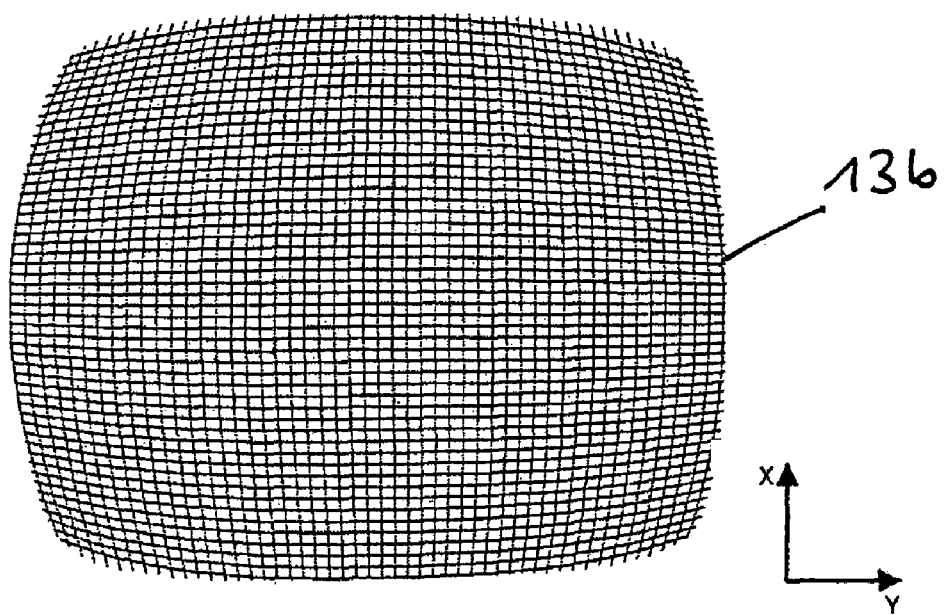

FIG. 5 diagrammatically shows a regular diffractive X-Y grating raster 13*a* while FIG. 6 shows a distorted X-Y grating raster 13*b* resulting from the grating raster 13*a* of FIG. 5 after deformation by back-molding in an inmold process. Such an X-Y grating raster 13*a*, 13*b* can be outstandingly well measured and the distortion ascertained by virtue of the deformation at every location of the grating raster. After characterisation and quantification of the resulting deformation of the grating raster the results are inverted and correspondingly transferred to the regular diffractive grating raster so that a distorted grating raster is introduced as a spatial structure into a multi-layer film. When now the multi-layer film which has been prepared in that way is back-molded, the pre-calculated deformation phenomena occur and the correspondingly pre-compensated, distorted grating raster is stretched in such a way that the result afforded is a regular diffractive grating raster.

Figure 7:
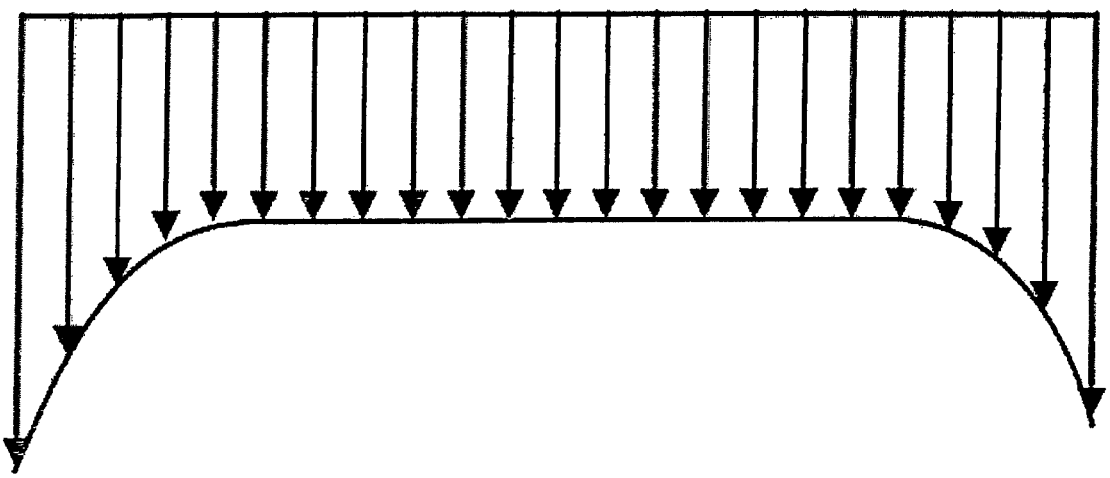
Figure 8:
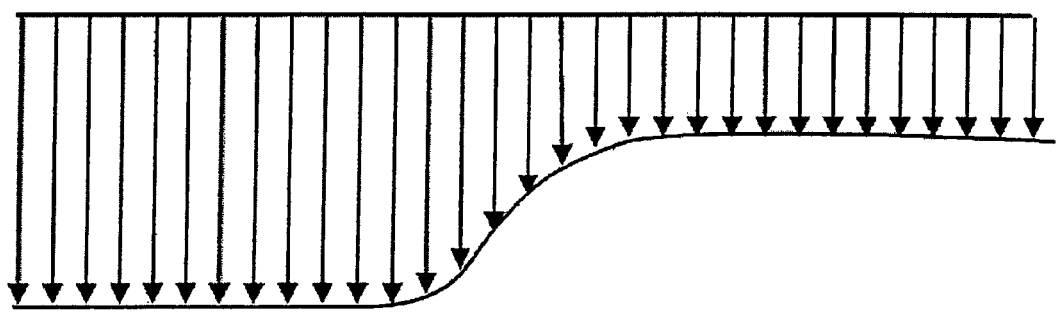

FIGS. 7 and 8 diagrammatically show the detection of local inclinations (gradients) at curved surfaces in perpendicular projection.

Figure 9:
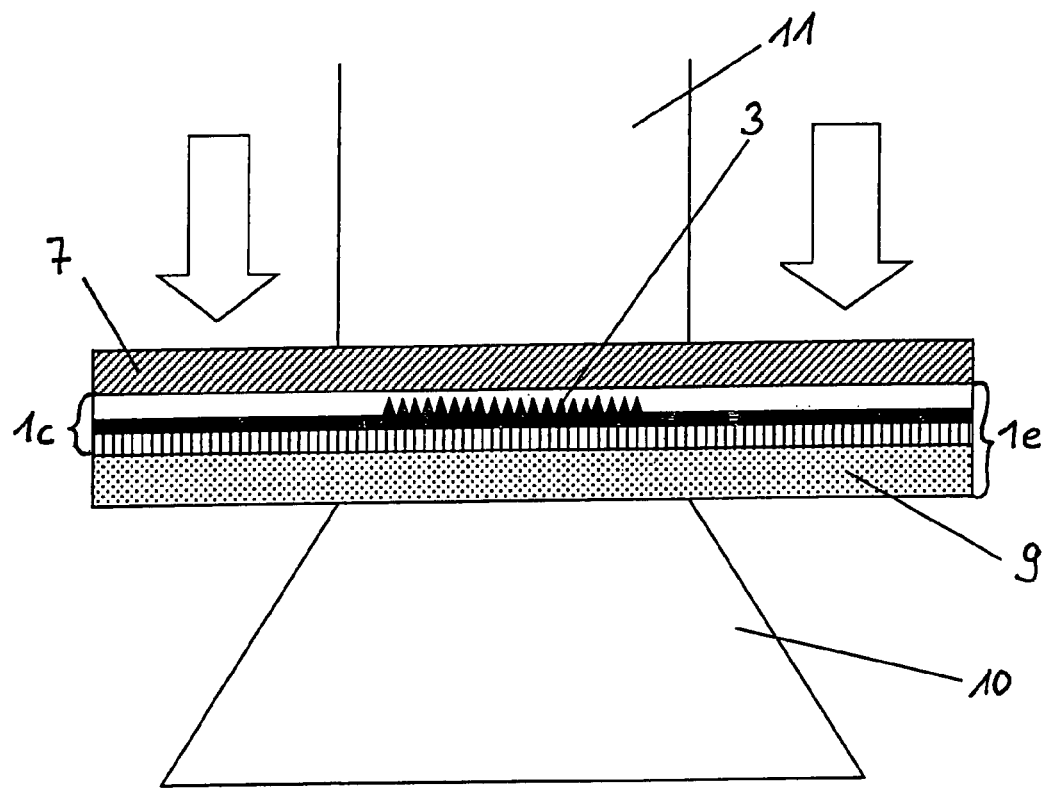

FIG. 9 diagrammatically shows an apparatus for shaping a mechanically reinforced multi-layer film 1e. In this case a transfer film as shown in FIG. 3 is embossed on to a flat plastic plate 9 and thus mechanically reinforced. The reinforced multi-layer film 1e inclusive of the carrier film 7 is arranged over a mold 10 and fixed in the flat region of the mold 10 with an upper punch 11 which presses the multi-layer film 1e inclusive of the carrier film 7 against the mold 10. The arrows arranged to the right and the left of the punch symbolise a heated shaping tool which presses the free ends of the reinforced multi-layer film 1e in the direction of the mold 10. When that happens, the multi-layer film 1e inclusive of the carrier film 7 is adapted to the outside contour of the mold 10 by means of deformation. That procedure results in the production of a shell portion 12 as is diagrammatically shown in cross-section in FIG. 10.

Figure 10:
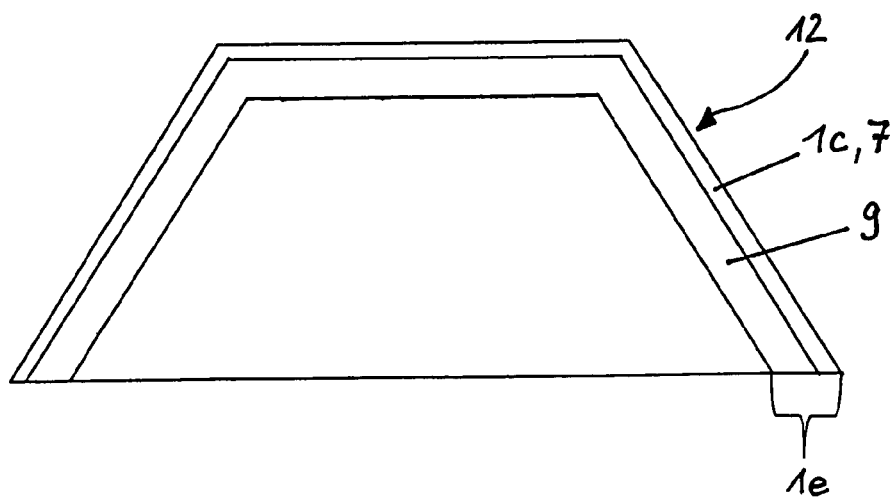
Figure 11:
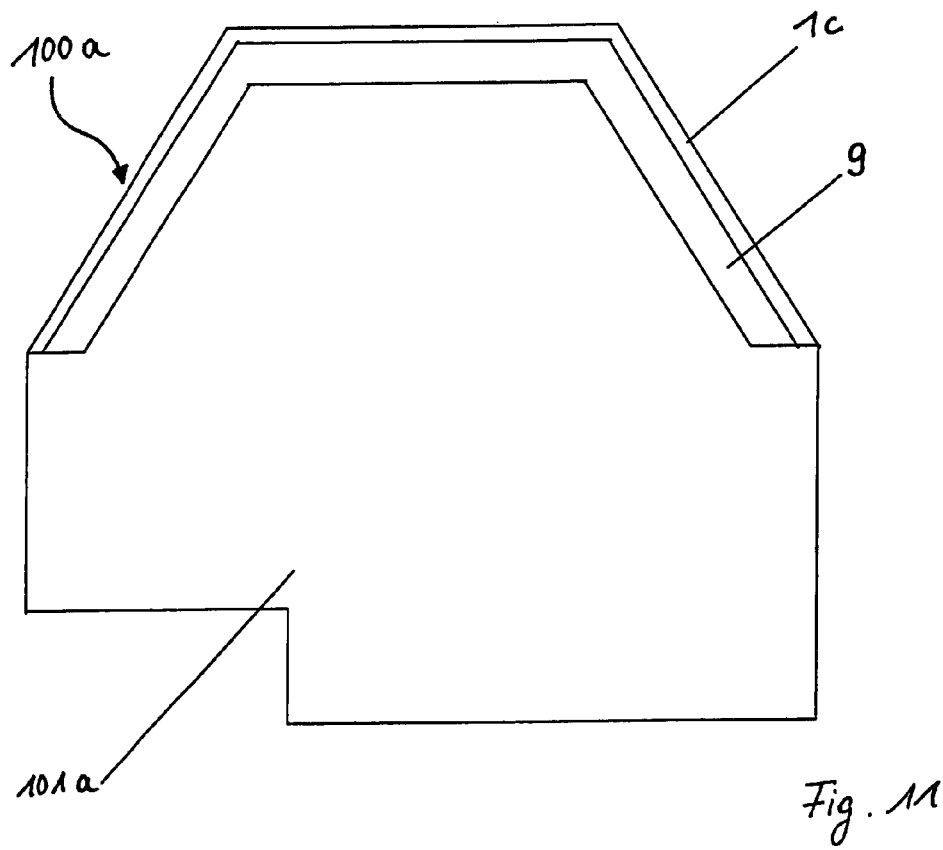

FIG. 11 shows a view in cross-section of an injection molded article 100a decorated with the shell portion 12 of FIG. 10. The shell portion 12 has been placed in an injection molding mold and back-molded on the side of the plastic plate 9 with opaque plastic material which hardens and forms the component 101a. After the carrier film 7 is pulled off the multi-layer film 1c is presented to the person viewing the decorated injection molded article 100a on the visible side thereof.

Figure 12:
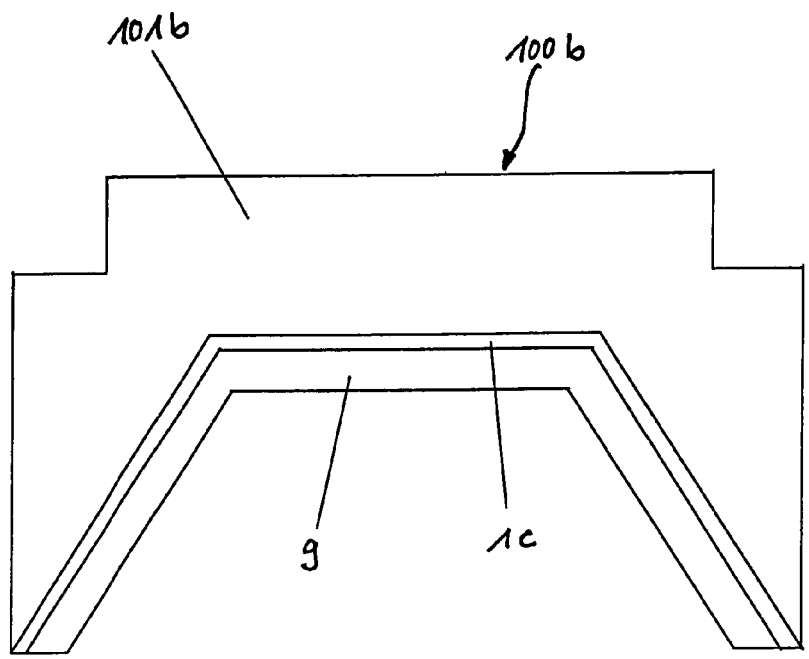

FIG. 12 is a view in cross-section showing a further injection molded article 100b decorated with the shell portion 12 of FIG. 10. The shell portion 12 was separated from the carrier film 7 and placed in an injection molding mold. On the side of the shell portion 12 which is opposite to the plastic plate 9 colorless transparent plastic material was injected over the shell portion, the plastic material hardening and forming the component 101b. The multi-layer film 1c is visible to the person viewing the decorated injection molded article 1b, on the visible side thereof, through the component 101b of colorless transparent plastic material.

The invention claimed is:

1. A multi-layer film for back-molding with a liquid plastic material in an inmold process for the production of a decorated injection molded article having curved surfaces, wherein the multi-layer film has at least one replication lacquer layer which at least on one of its surfaces has a spatial structure producing a visually perceptible and/or technical effect, wherein a contrast layer is arranged in adjoining relationship with at least one surface with a spatial structure at least in region-wise manner,
wherein the at least one replication lacquer layer is in the form of a radiation-hardened replication lacquer layer, and
wherein the multi-layer film has a receiving layer which is provided over the full surface area as viewed perpendicularly to the plane of the multi-layer film and on which the radiation-hardened replication lacquer layer is arranged only region-wise, and
wherein the radiation-hardened replication lacquer layer is arranged only in regions of the multi-layer film, which on the injection molded article decorated with the multi-layer film have a radius of curvature of greater than 0.7 mm and a stretch of less than 10%.

2. A multi-layer film as set forth in claim 1, wherein the radiation-hardened replication lacquer layer softens at temperatures above the injection temperature of the plastic material used for the back-molding operation.

3. A multi-layer film as set forth in claim 1, wherein the at least one radiation-hardened replication lacquer layer is hardened by means of UV radiation.

4. A multi-layer film as set forth in claim 1, wherein the multi-layer film forms the transfer layer means of a transfer film, wherein the transfer film has a carrier film which is releasable from the multi-layer film and wherein the multi-layer film is arranged at least region-wise on one side of the carrier film.

5. A multi-layer film as set forth in claim 4, wherein the multi-layer film on its side remote from the carrier film has an adhesive layer.

6. A multi-layer film as set forth in claim 4, wherein a transparent radiation-hardened replication lacquer layer adjoins the carrier film, wherein the spatial structure is embossed on the side of the radiation-hardened replication lacquer layer, that is remote from the carrier film.

7. A multi-layer film as set forth in claim 4, wherein a transparent receiving layer is arranged between the carrier film and the radiation-hardened replication lacquer layer.

8. A multi-layer film as set forth in claim 1, wherein the contrast layer is in the form of a reflection layer formed from metallic and/or non-metallically inorganic reflective materials.

9. A multi-layer film as set forth in claim 1, wherein the contrast layer has first regions and viewed in the plane of the multi-layer film arranged therebeside or in partially overlapping relationship with the first regions at least second regions, wherein the contrast layer is different in respect of transparency and color impression, in the first regions and in at least the second regions.

10. A multi-layer film as set forth in claim 1, wherein the spatial structure is at least region-wise in the form of a macroscopic structure, wherein the macroscopic structure has a length in the plane of the radiation-hardened replication lacquer layer of at least 0.03 mm and a length perpendicularly to the plane of the radiation-hardened replication lacquer layer in a range of between 0.01 and 0.1 mm.

11. A multi-layer film as set forth in claim 1, wherein the spatial structure is formed at least region-wise as a diffractive structure.

12. A multi-layer film as set forth in claim 11, wherein the spatial structure is formed at least region-wise as an asymmetrical matt structure.

13. A multi-layer film as set forth in claim 1, wherein the multi-layer film has a marking applied by means of laser, the marking being in the form of alphanumeric characters, geometrical patterns or graphic representations.

14. A multi-layer film as set forth in claim 1, wherein the multi-layer film has at least one colored decorative print.

15. A multi-layer film as set forth in claim 1, wherein the multi-layer film has at least one decorative print which is the same in color as the radiation-hardened replication lacquer layer, wherein the decorative print is arranged on the radiation-hardened replication lacquer layer and optically extinguishes region-wise the spatial structure in the radiation-hardened replication lacquer layer.

16. A multi-layer film as set forth in claim 1, wherein the multi-layer film as the spatial structure has lens elements or free form surfaces.

17. A multi-layer film as set forth in claim 1, wherein the multi-layer film has a dirt-repellent layer and/or a scratch-resistant layer which forms the surface of the decorated injection molded article.

18. A multi-layer film for back-molding with a liquid plastic material in an inmold process for the production of a decorated injection molded article having curved surfaces, wherein the multi-layer film has at least one replication lacquer layer which at least on one of its surfaces has a spatial structure producing a visually perceptible and/or technical effect, wherein a contrast layer is arranged in adjoining relationship with at least one surface with a spatial structure at least in region-wise manner, wherein the at least one replication lacquer layer is in the form of a radiation-hardened replication lacquer layer, and wherein the spatial structure is formed at least region-wise as a diffractive structure, and wherein the diffractive structure forms an optically variable element, and is arranged only in regions of the multi-layer film which have a stretch of less than 10% on the article which is decorated with the multi-layer film.

19. A multi-layer film as set forth in claim 18, wherein the multi-layer film has a receiving layer which is provided over the full surface area as viewed perpendicularly to the plane of the multi-layer film and on which the radiation-hardened replication lacquer layer is arranged only region-wise.

20. A multi-layer film for back-molding with a liquid plastic material in an inmold process for the production of decorated injection molded articles, wherein the multi layer film has at least one replication lacquer layer which at least on one of its surfaces has a spatial structure producing a visually perceptible and/or technical effect, wherein a contrast layer is arranged only region-wise in adjoining relationship with at least one surface with a spatial structure, and wherein the multi-layer film in regions without a contrast layer has at least in region-wise manner at least one function layer which can correspond to the replication lacquer layer, wherein the at least one function layer has reflecting and/or transmitting structures which are in the form of light-diffracting, light-refracting, light-diffusing, light-polarising or light-absorbing microstructures or nanostructures, and wherein the function layer includes:
a. at least one diffuser element for producing a uniform or adapted light distribution over the surface of the injection molded article decorated with the multi-layer film, and/or
b. at least one magnification lens having diffractive or refractive lens optical means, and/or
c. at least one dereflection layer or a motheye structure for reducing reflections or for improving transmission, and/or
d. at least one polarisation filter layer, and/or
e. at least one filter layer for filtering given wavelengths of visible light.

21. A multi-layer film as set forth in claim 20, wherein the microstructures or nanostructures are selected from the group consisting of matt structures, Fresnel lenses, microprisms, free form surfaces, diffractive structures and grating structures.

22. A decorated injection molded article having an injection molded plastic body whose surface is at least region-wise covered with and connected to a multi-layer film as set forth in claim 20, in an inmold process.

23. A decorated injection molded article as set forth in claim 22, wherein the decorated injection molded article forms an opaque or at least partially transparent housing component of a telephone or a cell phone.

24. A decorated injection molded article as set forth in claim 23, wherein at least one function layer is arranged in the region of the at least partially transparent housing component.

25. A decorated injection molded article as set forth in claim 22, wherein the decorated article is a cladding component for the interior or exterior region of an automobile.

26. A process for the production of a decorated injection molded article as set forth in claim 22, wherein the multi-layer film for forming a mechanically reinforced multi-layer film is embossed on to a flat, thermoplastic plate, the mechanically reinforced multi-layer film is thermoformed to afford a shell portion and the shell portion is back-molded with a plastic material in an inmold process.

27. A process as set forth in claim 26, wherein the mechanically reinforced multi-layer film is only deformed in partial regions in the thermoforming operation.

* * * * *